United States Patent
Lee et al.

(10) Patent No.: US 8,908,101 B2
(45) Date of Patent: Dec. 9, 2014

(54) METHOD AND APPARATUS FOR REDUCING NOISE OF VIDEO

(71) Applicants: Samsung Techwin Co., Ltd., Changwon (KR); Industry-Academic Cooperation Foundation, Yonsei University, Seoul (KR)

(72) Inventors: Chang-min Lee, Changwon (KR); Moon-gi Kang, Seoul (KR); Sang-wook Park, Seoul (KR); Min-seok Lee, Seoul (KR)

(73) Assignees: Samsung Techwin Co., Ltd., Chanwon (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 13/804,363

(22) Filed: Mar. 14, 2013

(65) Prior Publication Data

US 2013/0242198 A1    Sep. 19, 2013

(30) Foreign Application Priority Data

Mar. 14, 2012    (KR) .................. 10-2012-0026199
Jan. 14, 2013    (KR) .................. 10-2013-0004034

(51) Int. Cl.
*H04N 5/00*    (2011.01)
*G06T 5/00*    (2006.01)
*H04N 5/213*    (2006.01)

(52) U.S. Cl.
CPC ............... *H04N 5/213* (2013.01); *G06T 5/002* (2013.01); *G06T 2207/20182* (2013.01); *G06T 2207/20192* (2013.01); *G06T 2207/10016* (2013.01)

USPC ........................................... 348/607

(58) Field of Classification Search
None
See application file for complete search history.

(56) References Cited

U.S. PATENT DOCUMENTS

| 6,738,528 | B1* | 5/2004 | Nio et al. ...................... 382/268 |
| 7,373,013 | B2 | 5/2008 | Anderson |
| 7,705,918 | B2 | 4/2010 | Yamauchi |
| 7,711,044 | B1* | 5/2010 | Hoang et al. .................. 375/240 |
| 2006/0139494 | A1 | 6/2006 | Zhou et al. |
| 2008/0218630 | A1* | 9/2008 | Kempf et al. ................. 348/452 |
| 2011/0051005 | A1* | 3/2011 | Wu et al. ...................... 348/607 |

FOREIGN PATENT DOCUMENTS

| KR | 10-2006-0076176 A | 7/2006 |
| KR | 10-2011-0000446 A | 1/2011 |
| KR | 10-2011-0006869 A | 1/2011 |

* cited by examiner

*Primary Examiner* — Jefferey Harold
*Assistant Examiner* — Samira Monshi
(74) *Attorney, Agent, or Firm* — Sughrue Mion, PLLC

(57) ABSTRACT

A method and apparatus for reducing noise of a video image are provided. The method includes: reducing noise in a difference between a current frame and a previous frame in which temporal noise is reduced; detecting motion information about the current frame based on the difference in which the noise is reduced; reducing temporal noise in the current frame via a weighted sum of the current frame and the previous frame in which the temporal noise is reduced, according to the motion information; and reducing spatial noise in the current frame based on an edge direction of the current frame in which the temporal noise is reduced.

10 Claims, 8 Drawing Sheets

FIG. 9
(a)
|  |  |  |  |  |
|---|---|---|---|---|
|  |  |  |  |  |
|  |  |  | $X_i$ |  |
|  |  | $X_c$ |  |  |
|  |  |  |  |  |
|  |  |  |  |  |
(b)
| 0 | 1 | 0 | 0 | 0 |
|---|---|---|---|---|
| 1 | 1 | 1 | 0 | 0 |
| 1 | 1 | 1 | 0 | 0 |
| 1 | 1 | 1 | 0 | 0 |
| 1 | 1 | 0 | 0 | 0 |
(c)
| 0 | 0 | 0 | 1 | 1 |
|---|---|---|---|---|
| 1 | 0 | 0 | 1 | 0 |
| 1 | 0 | 1 | 0 | 0 |
| 0 | 0 | 1 | 1 | 0 |
| 1 | 0 | 0 | 0 | 1 |
FIG. 10
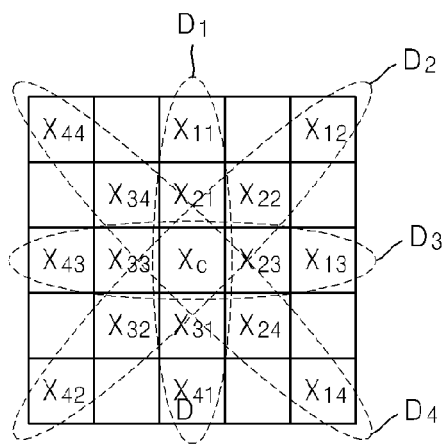
FIG. 11
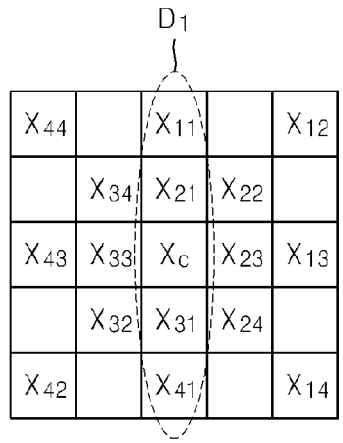

METHOD AND APPARATUS FOR REDUCING NOISE OF VIDEO

CROSS-REFERENCE TO RELATED PATENT APPLICATION

This application claims priority from Korean Patent Applications No. 10-2012-0026199 filed on Mar. 14, 2012 and No. 10-2013-0004034 filed on Jan. 14, 2013, in the Korean Intellectual Property Office, the disclosures of which are incorporated herein in their entirety by reference.

BACKGROUND

1. Field of the Invention

Methods and apparatuses consistent with exemplary embodiments relate to reducing noise of a video.

2. Description of the Related Art

Recently, digital images have been applied to various fields. Such digital images may be deteriorated due to noise generated during image processing operations including digital image obtaining, storing, and transmitting. The noise not only deteriorates the quality of the digital images, but also causes a drop in efficiency of processes related to compression, recognition, etc. Accordingly, noise reduction with respect to digital images is an important process in an image processing system, and research into improving quality while preserving characteristics of signals by reducing the noise has been requested.

A technique of reducing noise in a digital image is largely classified into spatial noise reduction, temporal noise reduction, and three-dimensional (3D) noise reduction (3DNR).

The spatial noise reduction reduces noise only in a spatial region and ignores a temporal region. The temporal noise reduction reduces noise while considering pixels in a temporal region. The 3DNR is a combination of the temporal noise reduction and the spatial noise reduction.

SUMMARY

One or more exemplary embodiments provide an apparatus and method of reducing thermal noise generated in an image sensor during video recording.

According to an aspect of an exemplary embodiment, there is provided a method of reducing temporal noise of a video image, the method including: reducing noise in a difference between a current frame and a previous frame in which temporal noise is reduced; and reducing temporal noise in the current frame according to motion information about the current frame after detecting the motion information based on the difference in which the noise is reduced.

The reducing the noise in the difference may include: calculating a sum of absolute difference (SAD) of corresponding pixels between the current frame and the previous frame in a local window of the current frame; and calculating an average difference by subtracting an offset value set according to a noise level from the SAD.

The detecting the motion information may include: calculating a first motion detection coefficient regarding a center pixel of the local window based on a constant set according to the offset value and the average difference; calculating a second motion detection coefficient via a weighted sum of an average value and a minimum value of the first motion detection coefficient, in the local window; and calculating a third motion detection coefficient of the current frame based on the second motion detection coefficient and a third motion detection coefficient of the previous frame, in the local window.

The reducing the temporal noise in the current frame may further include reducing the temporal noise in the current frame via a weighted sum of the current frame and the previous frame in which the temporal noise is reduced, by using the third motion detection coefficient.

According to an aspect of an exemplary embodiment, there is provided a method of reducing spatial noise in a video image, the method including: calculating an average of differences between a center pixel and adjacent pixels in a plurality of directions set based on the center pixel, in a local window of a current frame in which temporal noise is reduced; detecting a direction in which the average of the differences is minimum; and averaging pixel values of pixels in the detected direction.

The plurality of directions may include a widthwise direction, a lengthwise direction, a diagonal direction, and an inverse-diagonal direction based on the center pixel in the local window.

According to an aspect of an exemplary embodiment, there is provided a method of reducing noise of a video image, the method including: reducing noise in a difference between a current frame and a previous frame in which temporal noise is reduced; detecting motion information about the current frame based on the difference in which the noise is reduced; reducing temporal noise in the current frame via a weighted sum of the current frame and the previous frame in which the temporal noise is reduced, according to the motion information; and reducing spatial noise in the current frame based on an edge direction of the current frame in which the temporal noise is reduced.

The method may further include, before the reducing the noise in the difference, filtering the current frame and the previous frame in which the temporal noise is reduced by applying a mask whose size varies according to a noise level.

According to an aspect of an exemplary embodiment, there is provided an apparatus for reducing temporal noise in a video image, the apparatus including: a differentiator for reducing noise in a difference between a current frame and a previous frame in which temporal noise is reduced; and a coefficient calculator for detecting motion information about the current frame based on the difference in which the noise is reduced so as to reduce temporal noise of the current frame.

The differentiator may include: a first differentiator for calculating a sum of absolute difference (SAD) of corresponding pixels between the current frame and the previous frame in a local window of the current frame; and a second differentiator for calculating an average difference by subtracting an offset value set according to a noise level from SAD.

The coefficient calculator may include: a first coefficient calculator for calculating a first motion detection coefficient regarding a center pixel of the local window of the current frame based on a constant set according to the offset value and the average difference; a second coefficient calculator for calculating a second motion detection coefficient via a weighted sum of an average value and a minimum value of the first motion detection coefficient, in the local window of the current frame; and a third coefficient calculator for calculating a third motion detection coefficient of the current frame based on the second motion detection coefficient and a third motion detection coefficient of the previous frame, in the local window of the current frame.

The apparatus may further include a noise reducer for reducing temporal noise in the current frame via a weighted sum of the current frame and the previous frame in which the temporal noise is reduced, by using the third motion detection coefficient.

According to another aspect of the present invention, there is provided an apparatus for reducing spatial noise of a video image, the apparatus including: a direction differentiator for calculating an average of differences between a center pixel and adjacent pixels in a plurality of directions set based on the center pixel, in a local window of a current frame in which temporal noise is reduced; a minimum value detector for detecting a direction in which the average of the differences is minimum; and a noise reducer for reducing spatial noise in the current frame by averaging pixel values of pixels in the detected direction.

The plurality of directions may include a widthwise direction, a lengthwise direction, a diagonal direction, and an inverse-diagonal direction based on the center pixel in the local window.

According to an aspect of an exemplary embodiment, there is provided an apparatus for reducing noise of a video image, the apparatus including: a temporal noise reducer for reducing noise in a difference between a current frame and a previous frame in which temporal noise is reduced, and reducing temporal noise in the current frame via a weighted sum of the current frame and the previous frame in which the temporal noise is reduced, according to motion information about the current frame calculated based on the difference in which noise is reduced; and a spatial noise in the current frame reducer for reducing spatial noise based on an edge direction of the current frame in which the temporal noise is reduced.

The apparatus may further include a variable filter for filtering the current frame and the previous frame in which the temporal noise is reduced by applying a mask whose size varies according to a noise level, before reducing the noise in the difference between the current frame and the previous frame in which the temporal noise is reduced.

BRIEF DESCRIPTION OF THE DRAWINGS

The above and other aspects of the exemplary embodiments will become more apparent with reference to the attached drawings, in which:

FIGS. 9A through 9C are diagrams for describing a weight calculation according to an adaptive weight averaging (AWA) algorithm;

FIGS. 10 through 12 are diagrams for describing spatial noise reduction of FIG. 8, according to an exemplary embodiment;

DETAILED DESCRIPTION OF THE EXEMPLARY EMBODIMENTS

Figure 1:
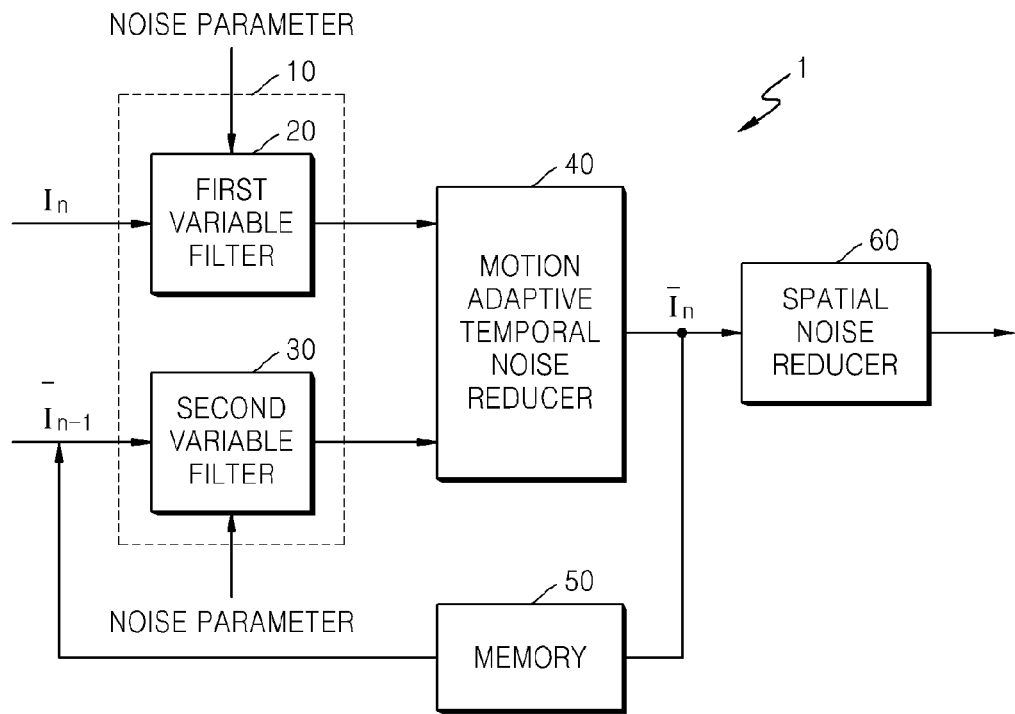
FIG. 1 is a block diagram schematically illustrating an apparatus for reducing noise of a video image, according to an exemplary embodiment.

As the inventive concept allows for various changes and numerous embodiments, some exemplary embodiments will be illustrated in the drawings and described in detail in the written description. However, this is not intended to limit the inventive concept to particular modes of practice, and it will to be appreciated that all changes, equivalents, and substitutes that do not depart from the spirit and technical scope of the inventive concept are encompassed in the inventive concept. In the description of the exemplary embodiments of the inventive concept, certain detailed explanations of related art are omitted when it is deemed that they may unnecessarily obscure the essence of the inventive concept.

While such terms as "first," "second," etc., may be used to describe various components, such components must not be limited to the above terms. The above terms are used only to distinguish one component from another.

The terms used in the present specification are merely used to describe the exemplary embodiments, and are not intended to limit the inventive concept. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

As used herein, the term "and/or" includes any and all combinations of one or more of the associated listed items.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram schematically illustrating an apparatus 1 for reducing noise of a video image, according to an embodiment.

Referring to FIG. 1, the apparatus 1 includes a variable filter 10, a motion adaptive temporal noise reducer 40, a memory 50, and a spatial noise reducer 60.

Video images (or a moving image) are input to the apparatus 1 in a frame unit.

The variable filter 10 functions as an N×M low-band pass filter (LPF) whose size varies in proportion to a noise level, wherein N and M are each a natural number. The variable filter 10 filters a current frame and a previous frame. Here, the previous frame is a frame in which temporal noise is reduced. The noise level may be a noise parameter having a predetermined value or a value input by a user. Also, the noise level may vary according to a sensor gain. It is assumed that noise levels of the current frame and the previous frame are the same.

The variable filter 10 includes a first variable filter 20 performing low-band pass filtering on the current frame, and a second variable filter 30 performing low-band pass filtering on the previous frame. Noise of the current frame and the previous frame may be reduced first via the low-band pass filtering before reducing temporal and spatial noise thereby to reduce an error during motion detection. When there is a relatively low amount of noise, the size of the variable filter 10 may be small so as to prevent motion blur which may be generated while reducing noise for motion detection. On the other hand, when there is a relatively large amount of noise, the size of the variable filter 10 may be large so as to sufficiently reduce noise for motion detection.

The motion adaptive temporal noise reducer (hereinafter, referred to as the temporal noise reducer) 40 reduces temporal noise based on motion information about the current frame that has been filtered. In order to accurately reduce noise from frames that are consecutively input, a moving object needs to be tracked between adjacent frames. However, when noise is high, it is difficult to accurately detect motion information about the moving object. Accordingly, the temporal noise reducer 40 reduces additional noise while detecting the motion information.

In detail, the temporal noise reducer 40 reduces noise included in a difference between the current frame and the previous frame in which the temporal noise is reduced. Then, the temporal noise reducer 40 reduces temporal noise of the current frame by calculating a motion detection coefficient indicating the motion information about the current frame based on the difference in which the noise is reduced.

Temporal noise reduction may be performed by detecting motion information between a current frame and a previous frame, and classifying pixels into a motion region and a non-motion region. In the non-motion region, a temporal filter may be applied to pixels in the current frame and the previous frame according to a time axis. In the motion region, noise may not be reduced by the temporal filter in order to avoid motion blur. According to an exemplary embodiment, temporal noise reduction is performed on a moving object in a motion region, and a blur phenomenon is reduced in the motion region while maintaining a noise reduction effect in the non-motion region as much as possible. Accordingly, noise included in a difference between a current frame and a previous frame is reduced by adding a difference of an offset value corresponding to noise to a difference between the temporally adjacent frames. Also, a motion detection coefficient is compensated for by reducing noise of the motion detection coefficient.

The memory 50 stores a frame in which temporal noise is reduced. The stored frame may be a previous frame and is referred to when reducing temporal noise of a following frame. The memory 50 is a temporary storage unit, and may be a frame buffer.

The spatial noise reducer 60 reduces spatial noise of a current frame in which temporal noise is reduced, based on an edge direction. The spatial noise reducer 60 obtains differences of a frame, in which temporal noise is reduced, in four main directions, and reduces spatial noise based on an average value regarding a direction in which a difference is minimum.

Figure 2:
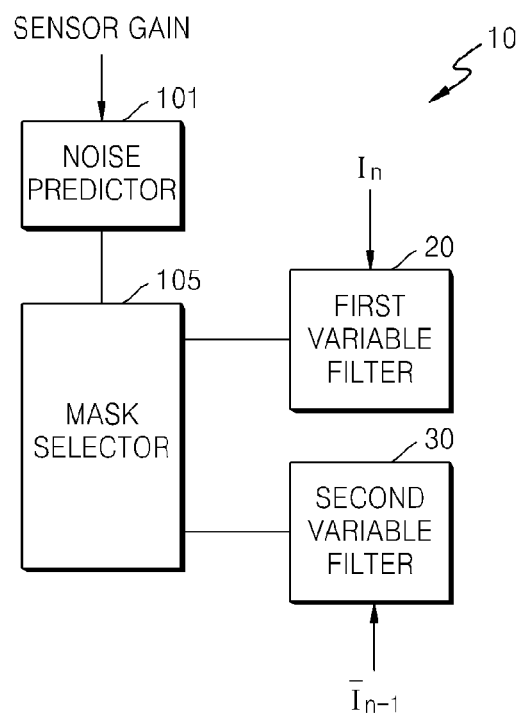
FIG. 2 is a block diagram schematically illustrating a variable filter according to an exemplary embodiment.
Figure 3:
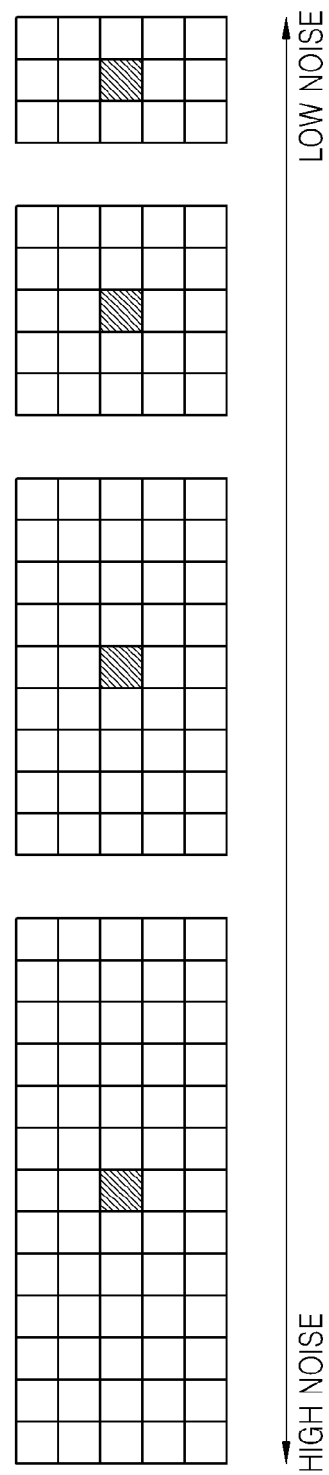
FIG. 3 illustrates an example of a mask according to an exemplary embodiment.

FIG. 2 is a block diagram schematically illustrating the variable filter 10 according to an exemplary embodiment. FIG. 3 illustrates an example of a mask according to an exemplary embodiment.

Referring to FIG. 2, the variable filter 10 includes a noise predictor 101 and a mask selector 105 in addition to the first variable filter 20, and the second variable filter 30.

The noise predictor 101 receives a noise parameter and predicts a noise level based on the noise parameter. The noise parameter may be a sensor gain of an image sensor (not shown). A luminance level of image data is amplified according to the sensor gain, and as the sensor gain is increased, noise is increased.

The mask selector 105 selects a mask corresponding to the predicted noise level. When the mask is large, it is easy to detect a motion in an image having a large amount of noise, but motion blur is generated to a large extent. When the mask is small, motion blur is small, but it is difficult to detect a motion if there is a large amount of noise. Accordingly, the mask selector 105 selects one of a plurality of masks according to the predicted noise level. For example, the mask selector 105 may pre-match one-to-one masks and noise levels, and select a mask corresponding to the predicted noise level. Alternatively, the mask selector 105 may select a mask according to a result of comparing the predicted noise level and a threshold value. Here, a plurality of threshold values may be set to find a range to which the predicted noise level corresponds, and select a mask one-to-one matched to the range. FIG. 3 illustrates masks respectively having 5×13, 5×9, 5×5, and 5×3 sizes. However, the masks shown in FIG. 3 are only examples, and the sizes of the masks may vary. A center of each mask corresponds to a location of a current pixel. As a noise level increases, the size of the mask increases, and as the noise level decreases, the size decreases. For example, when there is a relatively low amount of noise (noise level is low), the mask may have the 5×3 size, and when there is a relatively large amount of noise (noise level is high), the mask may have the 5×13 size. Masks of the first and second variable filters 20 and 30 have the same size.

The first variable filter 20 filters the current frame by applying the selected mask.

The second variable filter 30 filters the previous frame by applying the selected mask.

Figure 4:
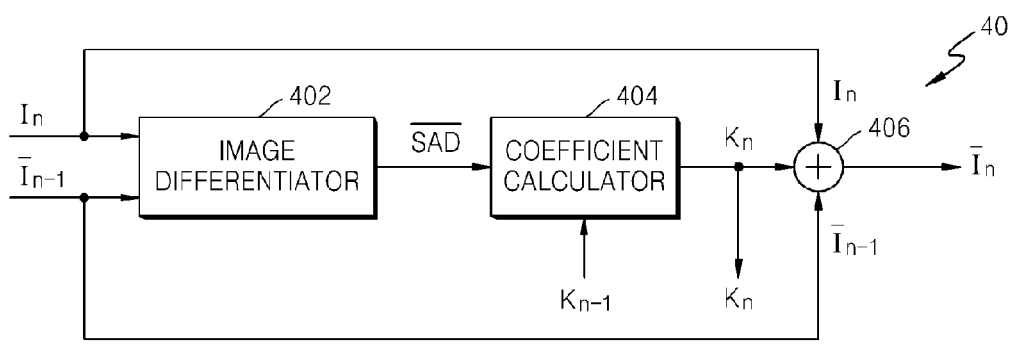
FIG. 4 is a block diagram schematically illustrating a temporal noise reducer according to an exemplary embodiment.
Figure 5:
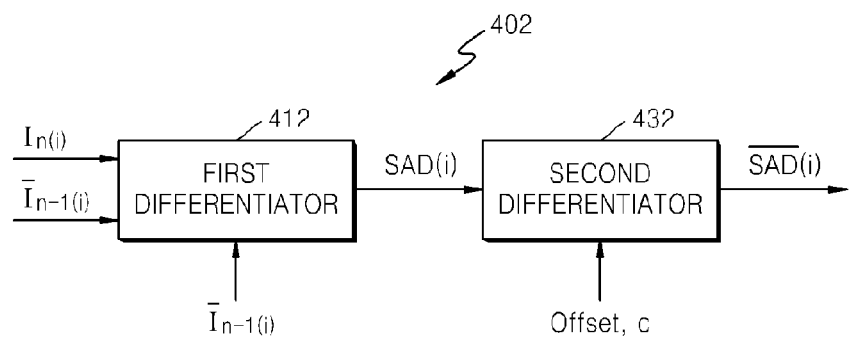
FIG. 5 is a block diagram schematically illustrating an image differentiator of FIG. 4, according to an exemplary embodiment.
Figure 7:
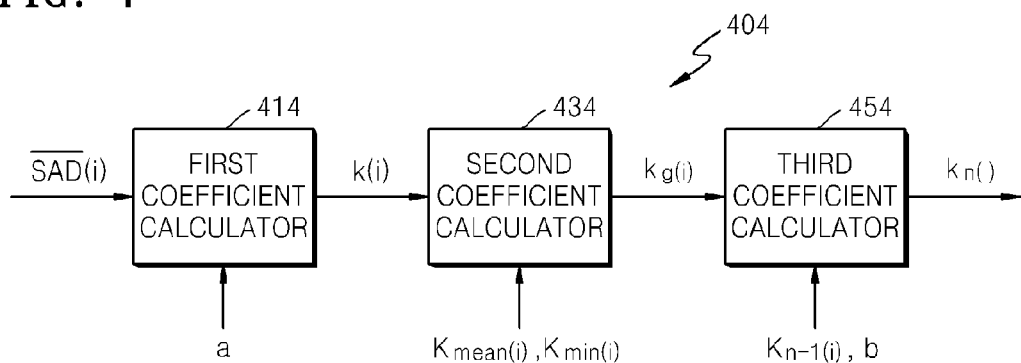
FIG. 7 is a block diagram schematically illustrating a coefficient calculator of FIG. 4, according to an exemplary embodiment.

FIG. 4 is a block diagram schematically illustrating the temporal noise reducer 40 according to an exemplary embodiment. FIG. 5 is a block diagram schematically illustrating an image differentiator 402 of FIG. 4. FIG. 7 is a block diagram schematically illustrating a coefficient calculator 404 of FIG. 4.

Referring to FIG. 4, the temporal noise reducer 40 includes the image differentiator 402, the coefficient calculator 404, and a time filter 406.

The image differentiator 402 reduces noise included in the difference of the current frame and the previous frame by subtracting an offset value set according to the noise level from the difference. Referring to FIG. 5, the image differentiator 402 includes a first differentiator 412 and a second differentiator 432. Here, the previous frame is a frame in which temporal noise is reduced.

Figure 6:
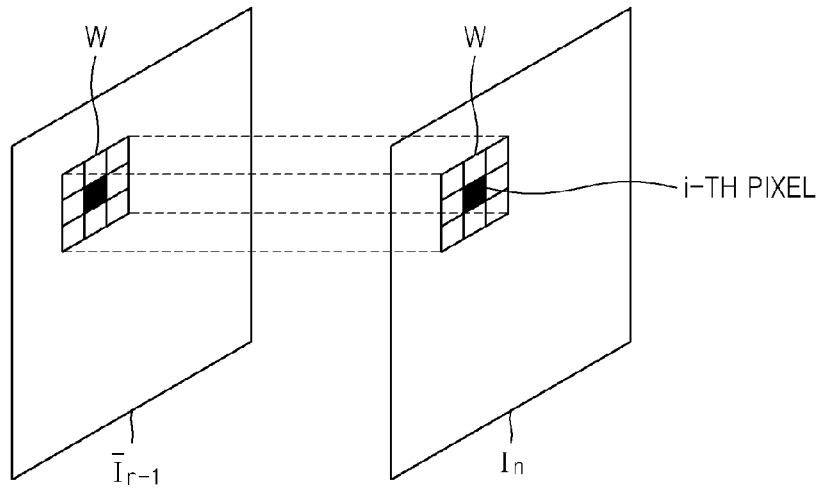
FIG. 6 illustrates an example of local windows corresponding to a current frame and a previous frame, according to an exemplary embodiment.

The first differentiator 412 calculates a sum of absolute difference, SAD(i), regarding each pixel. Equation 1 is used to calculate the SAD(i) at a location of a current pixel, i.e., i-th pixel, of the current frame. According to Equation 1, the SAD(i) is an average difference of the current frame and the previous frame in a local window W having a size of N×M. Here, m denotes a location of each pixel covered by the local window W, wherein the i-th pixel is a center pixel of the pixels covered by the local window W. Also, n(W) denotes the number of pixels covered by the local window W. FIG. 6 illustrates local windows W corresponding to a current frame $I_n$ and a previous frame $I_{n-1}$ for calculating SAD(i).

$$SAD(i) = \frac{\sum_{m \in W} |(I_n(m) - I_{n-1}(m)|}{n(W)} \quad (1)$$

The second differentiator 432 reduces a motion detection error caused by noise by obtaining an average difference of the i-th pixel, $\overline{SAD}(i)$, obtained by subtracting the offset value corresponding to the noise level from the SAD(i). As represented by Equation 2, the offset value is subtracted from the SAD(i) within a limit of not having a non-positive value, and then a constant c is added again. Here, the offset value is a constant variably set based on the amount of noise, wherein the offset value is high when the noise level is high and is low when the noise level is low. For example, the offset value is 15 when the noise level is relatively low, i.e., 3 dB, and is 30 when the noise level is relatively high, i.e., 10 dB. In order to prevent the noise from being difficult to be reduced since the difference between the SAD(i) and the offset value is 0, the constant c is added to a larger value from among 0 and the difference between the SAD(i) and the offset value. In other words, the constant c is a value near to 0 but is not 0, and is set such that the SAD(i) is not 0.

$$\overline{SAD}(i) = \max(SAD(i) - \text{Offset}, 0) + c \quad (2)$$

The coefficient calculator 404 calculates the motion detection coefficient indicating the motion information about the current frame based on the difference in which the noise is reduced. Referring to FIG. 7, the coefficient calculator 404 includes a first coefficient calculator 414, a second coefficient calculator 434, and a third coefficient calculator 454.

The first coefficient calculator 414 calculates a first motion detection coefficient k(i) of the i-th pixel based on the average difference and the constant set according to the offset value. The first coefficient calculator 414 calculates the first motion detection coefficient k(i) of the i-th pixel by scaling the average difference $\overline{SAD}(i)$ by using the constant set according to the offset value. As represented by Equation 3, the first coefficient calculator 414 calculates the first motion detection coefficient k(i) of the i-th pixel by multiplying a suitable scale constant a by the average difference $\overline{SAD}(i)$ such that the first motion detection coefficient k(i) has a value from 0 to 1. The scale constant a is set in correlation with the offset value. In other words, the scale constant a is set high when the offset value is high since the first motion detection coefficient k(i) has a small value, and is set low when the offset value is low since the first motion detection coefficient k(i) has a larger value compared to when the offset value is high. For example, when the noise is 3 dB, the offset value is 15 and the scale constant a is 0.025, and when the noise is 10 dB, the offset value is 30 and the scale constant a is 0.035.

$$k(i) = \min(a\overline{SAD}(i), 1) \quad (3)$$

The second coefficient calculator 434 uses an average value of the first motion detection coefficient k(i) in order to increase a noise reduction effect in a non-motion region. The second coefficient calculator 434 calculates a second motion detection coefficient $k_g(i)$ via a weighted sum of an average value and a minimum value of the first motion detection coefficient k(i), wherein the first motion detection coefficient k(i) is used as a weight, in the local window W of the current frame. That is, an average value $k_{mean}(i)$ of the first motion detection coefficient k(i) and a minimum value $k_{min}(i)$ of the first motion detection coefficient k(i) are calculated within a region of the local window W. Then, as represented by Equation 4, the second motion detection coefficient $k_g(i)$ is calculated by using the weighted sum using the first motion detection coefficient k(i) calculated according to Equation 3. The weight of the average value $k_{mean}(i)$, and of the first motion detection coefficient k(i) is the first motion detection coefficient k(i), and the weight of the minimum value $k_{min}(i)$ of the first motion detection coefficient k(i) is (1—first motion detection coefficient k(i)).

$$k_g(i) = k(i)k_{mean}(i) + (1-k(i))k_{min}(i) \quad (4)$$

The average value $k_{mean}(i)$ is a value obtained by averaging the first motion detection coefficients k(i) of pixels in the local window W of the current frame, as represented by Equation 5.

$$K_{mean}(i) = \frac{\sum_{m \in W} k(m)}{n(W)} \quad (5)$$

The minimum value $k_{min}(i)$ is a minimum value from among the first motion detection coefficients k(i) of the pixels in the local window W of the current frame, as represented by Equation 6.

$$k_{min}(i) = \min\{k(i), i \in W\} \quad (6)$$

The third coefficient calculator 454 uses motion information about an adjacent pixel and motion information about a corresponding pixel of a previous frame as temporal motion information, so as to minimize a blur in a motion region. The third coefficient calculator calculates a third motion detection coefficient $k_n(i)$ of the current frame based on the second motion detection coefficient $k_g(i)$ and a third motion detection coefficient $k_{n-1}(i)$ of the previous frame, in the local window W of the current frame. As represented by Equation 7 below, a maximum value $k_e(i)$ of the second motion detection coefficient $k_g(i)$ is obtained in the local window W of the current frame. Also, as represented by Equation 8 below, a first larger value from among 0 and a difference between the third motion detection coefficient $k_{n-1}(i)$ and a constant b is obtained, and a second larger value from among the first larger value and the maximum value $k_e(i)$ of the second motion detection coefficient $k_g(i)$ obtained in Equation 7 is determined as the third motion detection coefficient $k_n(i)$.

$$k_e(i) = \max\{k_g(i), i \in W\} \quad (7)$$

$$k_n(i) = \max\{k_g(i), \max(k_{n-1}(i) - b, 0)\} \quad (8)$$

The third motion detection coefficient $k_n(i)$ finally obtained according to Equation 8 may be used as a coefficient of the time filter 406. The third motion detection coefficient $k_n(i)$ has a value from 0 to 1, wherein the value is near 1 in a region having a large amount of motion and is near 0 in a region having a small amount of motion.

The time filter 406 reduces the temporal noise of the current frame via the weighted sum of the current frame and the previous frame, by using the third motion detection coefficient $k_n(i)$ of the current frame as the weight. As represented by Equation 9 below, the weight of the current frame is the third motion detection coefficient, and the weight of the previous frame in which the temporal noise is reduced is (1—third motion detection coefficient). The time filter 406 outputs the current frame $\bar{I}_n(i)$ in which the temporal noise is reduced.

$$\bar{I}_n = k_n(i)I_n(i) + (1-k_n(i))\bar{I}_{n-1}(i) \quad (9)$$

Here, $\bar{I}_{n-1}(i)$ denotes the previous frame stored in the memory 50 and in which the temporal noise is reduced, $I_n(i)$ denotes the current frame, and $\bar{I}_n(i)$ denotes the current frame in which the temporal noise is reduced. When a motion is large, the third motion detection coefficient $k_n(i)$ has a value close to 1, the current frame $I_n(i)$ has a high weight, and the previous frame $\bar{I}_{n-1}(i)$ has a low weight in order to reduce a motion blur. On the other hand, when a motion is small, the third motion detection coefficient $k_n(i)$ has a value close to 0, the current frame $I_n(i)$ having relatively high noise level has a low weight, and the previous frame $\bar{I}_{n-1}(i)$ that has been stored in the memory 50 after noise is reduced has a high weight in order to increase a noise reduction effect.

Figure 8:
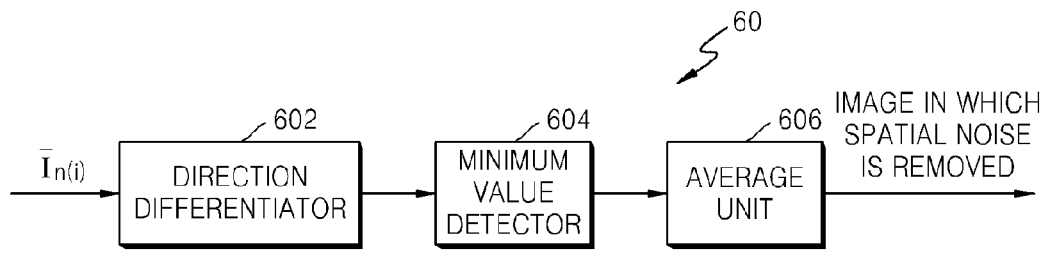
FIG. 8 is a block diagram schematically illustrating a spatial noise reducer according to an exemplary embodiment.
Figure 12:
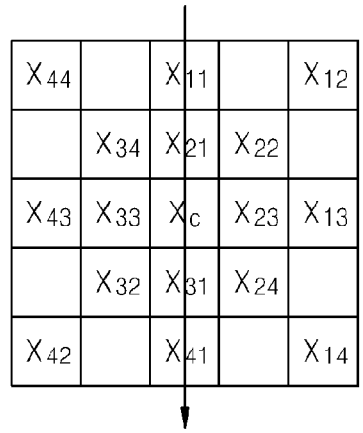

FIG. 8 is a block diagram schematically illustrating the spatial noise reducer 60 according to an exemplary embodiment. FIGS. 10 through 12 are diagrams for describing spatial noise reduction of FIG. 8.

FIGS. 9A through 9C are diagrams for describing a weight calculation according to an adaptive weight averaging (AWA) algorithm.

The AWA algorithm that is a general two-dimensional noise reduction (2DNR) algorithm for reducing spatial noise may be indicated by a sum of weights $w_i$ of a center pixel $x_c$ and an adjacent pixel $x_i$ in a predetermined window S as shown in FIG. 9A and represented by Equation 10 below, wherein the weight $w_i$ is set to be 1 when a difference $|x_i - x_c|$ between the center pixel $x_c$ and the adjacent pixel $x_i$ is lower than or equal to a predetermined threshold value Th, and is set to 0 when the difference $|x_i - x_c|$ is equal to or higher than the predetermined threshold value Th.

$$\bar{x} = \frac{1}{W}\sum_{i \in S} w_i x_i, \quad W = \sum_{i \in S} w_i \quad (10)$$

$$w_i = \begin{cases} 1, & |x_i - x_c| < Th \\ 0, & \text{otherwise} \end{cases}$$

Referring to FIG. 9B, weights of the AWA algorithm are relatively accurately obtained when an edge image has a low noise level. However, when the noise level is high as shown in FIG. 9C, it is very difficult to determine an edge region, and thus a distribution of corresponding weights does not show a shape of a pattern of the edge region but shows a distribution of random noise. Thus, according to the AWA algorithm, noise that was not reduced from a motion region in which temporal noise is reduced (3DNR) is not properly reduced, and noise is still left in the motion region or the edge region even after the AWA algorithm.

Accordingly, the spatial noise reducer 60 according to an exemplary embodiment is a directional average filter that limits a shape of a pattern only to four main directions, i.e., a widthwise direction, a lengthwise direction, a diagonal direction, and an inverse-diagonal direction, and performs spatial noise reduction (2DNR) in only the limited directions.

Referring to FIG. 8, the spatial noise reducer 60 may include a direction differentiator 602, a minimum value detector 604, and an average unit 606.

The direction differentiator 602 calculates an average value of differences between a center pixel and adjacent pixels in a plurality of directions set based on the center pixel, in a local window W of the current frame $\bar{I}_n(i)$ in which the temporal noise is reduced. Here, the local window W may be different from a local window of the temporal noise reducer 40, and in the current embodiment, the local window W may be a 5×5 window.

As represented by Equation 11 below, four differences are obtained based on the four main directions. Here, I denotes an index indicating a direction, and $S_I$ denotes a group of adjacent pixels excluding the center pixel $x_c$ in the I direction.

$$D_I = \frac{1}{4}\sum_{x \in S_I}|x - x_c|, k = 1, 2, 3, 4 \quad (11)$$

$$S_1 = \{x_{11}, x_{21}, x_{31}, x_{41}\}, S_2 = \{x_{12}, x_{22}, x_{32}, x_{42}\}$$

$$S_3 = \{x_{13}, x_{23}, x_{33}, x_{44}\}, S_4 = \{x_{14}, x_{24}, x_{34}, x_{44}\}$$

Also referring to FIG. 10, a first direction is the lengthwise direction, a second direction is the diagonal direction, a third direction is the widthwise direction, and a fourth direction is the inverse-diagonal direction. Also, in the 5×5 window, $S_1$ denotes a group of adjacent pixels in the first direction, $S_2$ denotes a group of adjacent pixels in the second direction, $S_3$ denotes a group of adjacent pixels in the third direction, and $S_4$ denotes a group of adjacent pixels in the fourth direction. An average difference $D_I$ that is an average of differences between the center pixel $x_c$ and the adjacent pixels of the 5×5 window in each direction is obtained.

The minimum value detector 604 detects a direction where the average difference $D_I$ is minimum. As represented by Equation 12 below, a minimum value $D_{min}$ from among average differences $D_1$, $D_2$, $D_3$, and $D_4$ of the four directions is detected. FIG. 11 shows that the average difference $D_1$ in the lengthwise direction is obtained as the minimum value $D_{min}$. In other words, a region of FIG. 10, i.e., a local region covered by the 5×5 window including the center pixel x, and the adjacent pixels, may be an edge in a lengthwise direction.

$$D_{min} = \text{argmin}\{D_1\}, \bar{S} = S_1 \cup \{x_c\}$$

$$S_1 = \{x_{11}, x_{21}, x_{31}, x_{41}\}, S_2 = \{x_{12}, x_{22}, x_{32}, x_{42}\}$$

$$S_3 = \{x_{13}, x_{23}, x_{33}, x_{43}\}, S_4 = \{x_{14}, x_{24}, x_{34}, x_{44}\} \quad (12)$$

The average unit 606 reduces the spatial noise of the current frame by averaging pixel values of pixels in the direction in which the average difference is the minimum. Here, all pixel values of the center pixel and the adjacent pixels are averaged. In Equation 13 below, $\bar{S}$ denotes a group of the center pixel $x_c$ and the adjacent pixels included in the group $S_I$, and $n(\bar{S})$ denotes the number of pixels in the group. FIG. 12 illustrates how an average value is obtained only in regard to pixels in a region in a lengthwise direction.

$$\bar{S} = S_i \cup \{x_c\} \quad (13)$$

$$\bar{x} = \frac{1}{n(\bar{S})}\sum_{x \in \bar{S}} x$$

Figure 13:
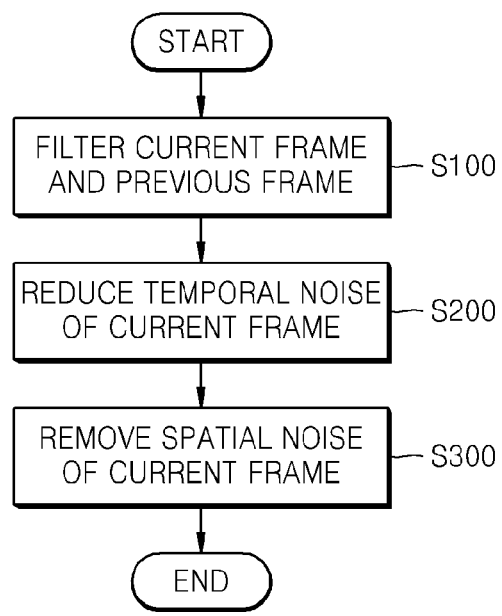
FIG. 13 is a flowchart illustrating a method of reducing noise of a video image, according to an embodiment of the present invention.
Figure 14:
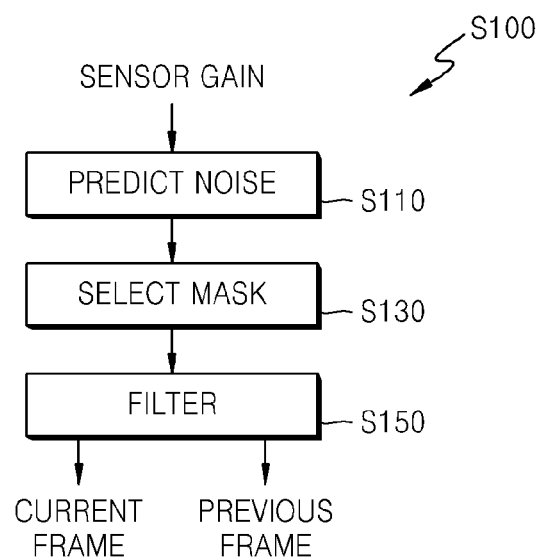
FIG. 14 is a flowchart illustrating in detail a filtering method of FIG. 13, according to an exemplary embodiment.
Figure 15:
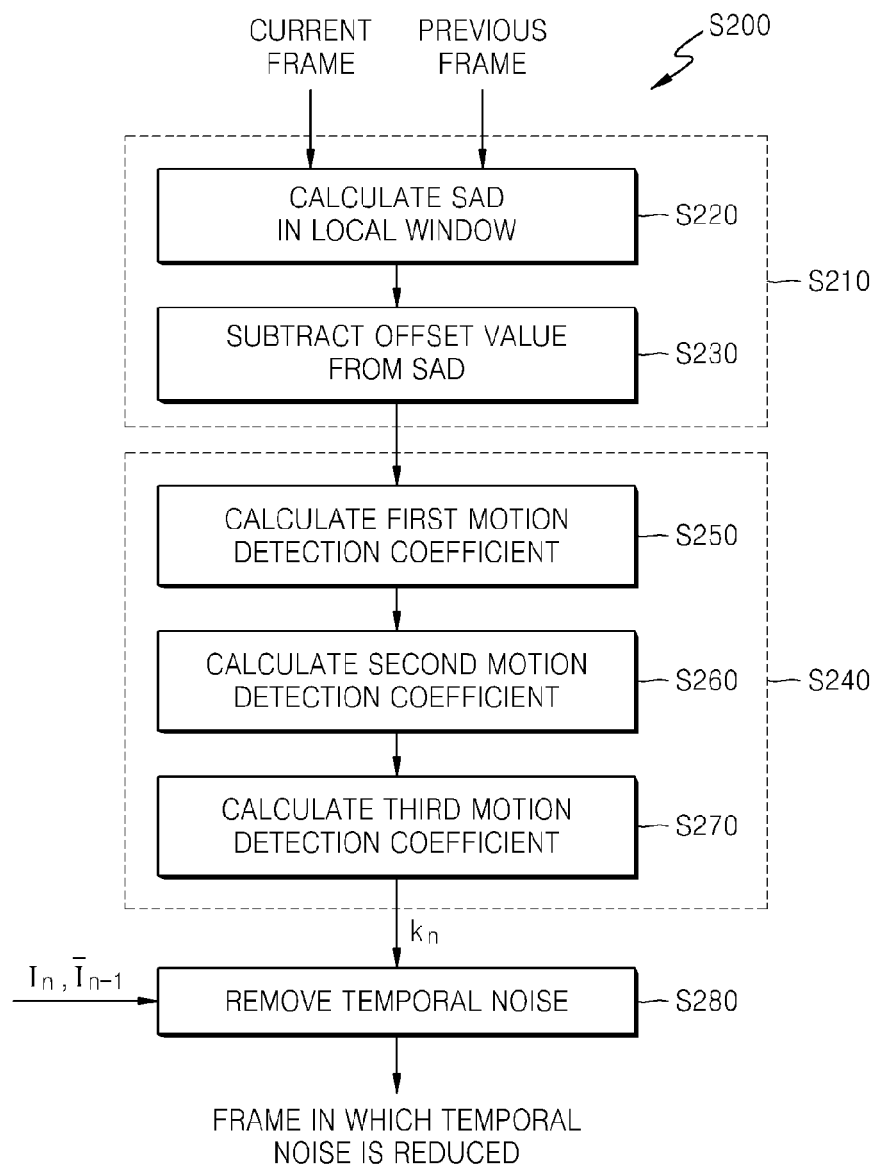
FIG. 15 is a flowchart illustrating in detail a temporal noise removing method of FIG. 13, according to an exemplary embodiment.
Figure 16:
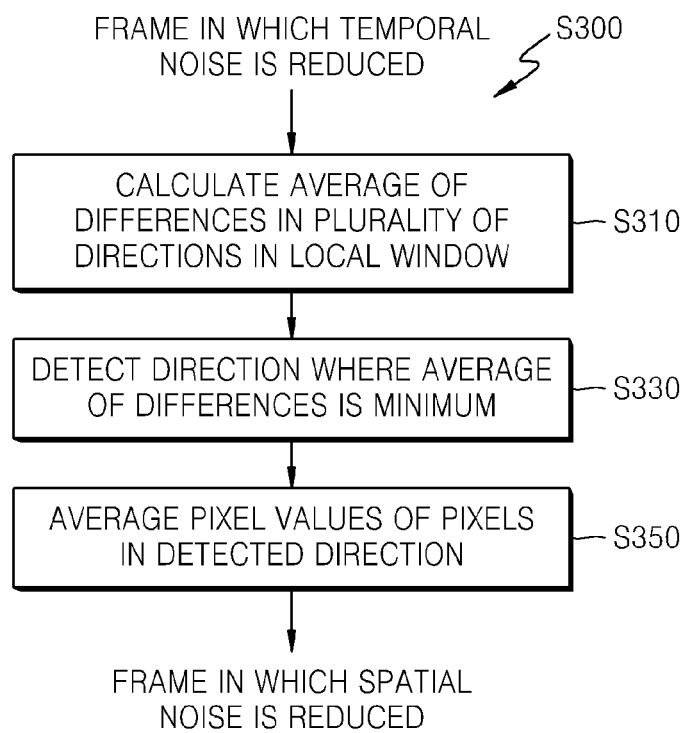
FIG. 16 is a flowchart illustrating in detail a spatial noise removing method of FIG. 13, according to an exemplary embodiment.

FIG. 13 is a flowchart illustrating a method of reducing noise of a video image, according to an exemplary embodiment. FIG. 14 is a flowchart illustrating in detail operation S100 of FIG. 13, according to an exemplary embodiment. FIG. 15 is a flowchart illustrating in detail operation S200 of FIG. 13, according to an exemplary embodiment. FIG. 16 is a flowchart illustrating in detail operation S300 of FIG. 13, according to an exemplary embodiment. Details overlapping those described above with reference to FIGS. 1 through 12 will not be repeated here.

Referring to FIG. 13, noise is reduced by filtering a current frame and a previous frame in operation S100. Here, the previous frame is a frame in which temporal noise is reduced. The current frame and the previous frame are filtered by an N×M mask whose size varies in proportion to a noise level, wherein N and M are each a natural number. Here, the noise level may be predetermined or input by a user. Also, the noise level may vary according to a gain sensor. It is assumed that noise levels of the current frame and the previous frame are the same. Accordingly, the same size of a mask may be used to filter the current frame and the previous frame, according to an exemplary embodiment.

The operation S100 of filtering the current frame and the previous frame is detailed in reference to FIG. 14. First, the noise level is predicted from a noise parameter in operation S110. For example, the noise level may be predicted from a value of the sensor gain. The sensor gain may be provided as information about an image pickup device from a controller of an image processing system. A mask matching the predicted noise level is selected in operation S130. The plurality of masks may be predetermined according to the noise levels. The current frame and the previous frame are each filtered by the selected mask, in operation S150. Before temporal and spatial noise reductions are performed, the current frame and the previous frame may be filtered to reduce noise thereby to reduce an error during motion detection. Also, by varying the size of the mask according to noise, motion blur may be minimized.

Next, temporal noise reduction and spatial noise reduction of the current frame and the previous frame, which have been filtered, will be described in reference to FIGS. 13 and 15.

As shown in FIG. 13, temporal noise is reduced in the current frame by using motion information detected from the current frame and the previous frame in operation S200.

The operation S200 of reducing temporal noise in the current frame is detailed in reference to FIG. 15. First, noise is reduced from a difference between the current frame and the previous frame in which temporal noise is reduced, in operation S210. Specifically, a sum of absolute difference (SAD) of corresponding pixels between the current frame and the previous frame is calculated in a local window, in operation S220. An average difference is calculated in operation S230 by subtracting an offset value set according to the noise level of the current frame from the SAD. The offset value may be predetermined or input by the user.

Motion information about the current frame is detected based on the difference in which noise is reduced in S240, and temporal noise of the current frame is reduced according to the motion information in operations S240 and S280. The motion information about the current frame includes a motion detection coefficient indicating a motion amount of each pixel. In detail, the motion detection coefficient is calculated as follows.

First, a first motion detection coefficient of each pixel is calculated in operation S250, based on the average difference and a constant set according to the offset value. The first motion detection coefficient is calculated by scaling the average difference by using the constant set according to the offset value for the first motion detection coefficient to have a value from 0 to 1.

Then, a second motion detection coefficient is calculated in operation S260 according to a weighted sum of an average value and a minimum value of the first motion detection coefficient in the local window of the current frame. A weight of the average value of the first motion detection coefficients is the first motion detection coefficient, and a weight of the minimum value of the first motion detection coefficients is (1−first motion detection coefficient).

Then, a third motion detection coefficient of the current frame is calculated in operation S270 based on the second motion detection coefficient and a third motion detection coefficient of the previous frame, in the local window of the current frame. In order to minimize a motion blur, a maximum value of the second motion detection coefficient is obtained in a block unit, i.e., a local window unit, and a larger value from among the maximum value of the second motion detection coefficient and a larger value from among 0 and a difference between the third motion detection coefficient of the previous frame and a constant is determined as the third motion detection coefficient. The third motion detection coefficient has a value from 0 to 1, wherein the third motion detection coefficient has a value near 1 when a motion is large and has a value near 0 when a motion is small.

The temporal noise of the current frame is reduced in operation S280 via a weighted sum of the current frame and the previous frame in which the temporal noise is reduced, by using the third motion detection coefficient. The weight of the current frame is the third motion detection coefficient and the weight of the previous frame in which the temporal noise is reduced is (1—third motion detection coefficient).

Referring back to FIG. 13, spatial noise is reduced in the current frame in which the temporal noise is reduced, based on an edge direction in operation S300. In detail, also referring to FIG. 16, an average of differences between a center pixel and adjacent pixels in a plurality of directions set based on the center pixel is calculated, in a local window of the current frame in which the temporal noise is reduced in operation S310. Here, the plurality of directions may include a widthwise direction, a lengthwise direction, a diagonal direction, and an inverse-diagonal direction. Also, a direction where the average of the differences is minimum is detected in operation S330. Then, pixel values of pixels in the detected direction are averaged in operation S350.

According to general methods of reducing video noise, noise reduction intensity is adjusted by simply changing a slope of a motion detection coefficient during temporal noise reduction. However, according to one or more embodiments, motion blur caused by noise reduction is minimized while a noise reduction effect is increased by applying an offset value to a motion detection coefficient, and by using an average value of the motion detection coefficients, spatial motion information according to motion information about adjacent pixels, and temporal motion information according to motion information about a previous frame.

According to the exemplary embodiments, the quality of video images having motion may be improved by increasing a noise reduction effect in a non-motion region while decreasing a blur in a motion region.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:
1. A method of reducing noise in a video image, the method comprising:
  detecting motion information about a current frame based on a difference between the current frame and a previous frame in which temporal noise is reduced reducing temporal noise in the current frame, according to the motion information about the current frame; and wherein the detecting the motion information comprises:

calculating an average difference by subtracting an offset value set according to a noise level from a sum of absolute difference (SAD) of corresponding pixels between the current frame and the previous frame, in a local window, calculating a first motion detection coefficient regarding a center pixel of the local window based on a constant set according to the offset value, and the average difference;

calculating a second motion detection coefficient via a weighted sum of an average value and a minimum value of the first motion detection coefficient, in the local window; and calculating a third motion detection coefficient of the current frame based on the second motion detection coefficient and a third motion detection coefficient of the previous frame, in the local window.

2. The method of claim 1, wherein the method further comprising:

reducing a spatial noise in the current frame based on an edge direction of the current frame in which the temporal noise is reduced; and the reducing the spatial noise comprises:

calculating an average of differences between a center pixel and adjacent pixels in a plurality of directions set based on the center pixel, in a local window of the current frame in which temporal noise is reduced;

detecting the edge direction in which the average of the differences is minimum; and averaging pixel values of pixels in the detected edge direction.

3. The method of claim 1, further comprising, before the detecting motion information, filtering the current frame and the previous frame in which the temporal noise is reduced by applying a mask whose size varies according to a noise level.

4. An apparatus for reducing noise in a video image, the apparatus comprising:

a temporal noise reducer which detects motion information about a current frame based on a difference between the current frame and a previous frame in which temporal noise is reduced, and reduces temporal noise in the current frame according to the motion information about the current frame, wherein the temporal noise reducer comprises:

an image differentiator which calculates an average difference by subtracting an offset value set according to a noise level from a sum of absolute difference (SAD) of corresponding pixels between the current frame and the previous frame, in a local window;

a first coefficient calculator which calculates a first motion detection coefficient regarding a center pixel of the local window of the current frame based on a constant set according to the offset value, and the average difference;

a second coefficient calculator which calculates a second motion detection coefficient via a weighted sum of an average value and a minimum value of the first motion detection coefficient, in the local window; and a third coefficient calculator for calculating a third motion detection coefficient of the current frame based on the second motion detection coefficient and a third motion detection coefficient of the previous frame, in the local window.

5. The apparatus of claim 4, the apparatus further comprising;

a spatial noise reducer which reduces spatial noise in the current frame based on an edge direction of the current frame in which the temporal noise is reduced, and wherein the spatial noise reducer calculates an average of differences between a center pixel and adjacent pixels in a plurality of directions set based on the center pixel, in a local window of the current frame in which the temporal noise is reduced, and averaging pixel values of pixels in the edge direction in which the average of the differences is minimum.

6. The apparatus of claim 4, further comprising a variable filter which filters the current frame and the previous frame in which the temporal noise is reduced by applying a mask whose size varies according to a noise level, before the detecting the motion information.

7. The apparatus of claim 4, wherein the temporal noise reducer which reduces the temporal noise of the current frame via a weighted sum of the current frame and the previous frame in which the temporal noise is reduced, by using the third motion detection coefficient.

8. The apparatus of claim 5, wherein the plurality of directions comprises a widthwise direction, a lengthwise direction, a diagonal direction, and an inverse-diagonal direction based on the center pixel in the local window.

9. The method of claim 1, wherein the reducing the temporal noise in the current frame further comprises reducing temporal noise of the current frame via a weighted sum of the current frame and the previous frame in which the temporal noise is reduced, by using the third motion detection coefficient.

10. The method of claim 2, wherein the plurality of directions comprises a widthwise direction, a lengthwise direction, a diagonal direction, and an inverse-diagonal direction.

* * * * *